(12) United States Patent  
Clark et al.

(10) Patent No.: US 8,272,372 B2  
(45) Date of Patent: Sep. 25, 2012

(54) APPARATUS FOR TREATING CRANKCASE GASES FROM ENGINES

(76) Inventors: George Clark, Conroe, TX (US); Janet S. Clark, Conroe, TX (US)

( * ) Notice: Subject to any disclaimer, the term of this patent is extended or adjusted under 35 U.S.C. 154(b) by 0 days.

(21) Appl. No.: 13/270,460

(22) Filed: Oct. 11, 2011

(65) Prior Publication Data

US 2012/0023878 A1    Feb. 2, 2012

Related U.S. Application Data

(63) Continuation of application No. 12/203,815, filed on Sep. 3, 2008, now Pat. No. 8,051,844.

(51) Int. Cl.
*F02B 25/06*      (2006.01)
(52) U.S. Cl. .................................................. 123/572
(58) Field of Classification Search .......... 123/572–574, 123/41.86
See application file for complete search history.

(56) References Cited

U.S. PATENT DOCUMENTS

| 2,558,478 | A | * | 6/1951 | Chase | 123/41.86 |
| 3,779,221 | A | * | 12/1973 | Gartner | 123/573 |
| 3,877,451 | A | * | 4/1975 | Lipscomb | 123/573 |
| 4,409,950 | A | * | 10/1983 | Goldberg | 123/573 |
| 5,072,713 | A | * | 12/1991 | Sweeten | 123/573 |
| 5,417,184 | A | * | 5/1995 | McDowell | 123/41.86 |
| 8,051,844 | B2 | * | 11/2011 | Clark et al. | 123/572 |
| 2009/0050121 | A1 | * | 2/2009 | Holzmann et al. | 123/573 |
| 2009/0314230 | A1 | * | 12/2009 | Nagenkogl et al. | 123/41.44 |

* cited by examiner

*Primary Examiner* — Marguerite McMahon
(74) *Attorney, Agent, or Firm* — Claude E. Cooke, Jr.; John J. Love; Cooke Law Firm

(57) ABSTRACT

Apparatus is provided for removing oil from crankcase gases flowing from an internal combustion engine. The apparatus includes filtration particles, contained within an outer case, that collect oil particles and allow drainage of the oil into an accumulator. The apparatus includes a separation chamber which initially causes the oil to separate from the crankcase gases.

7 Claims, 3 Drawing Sheets

APPARATUS FOR TREATING CRANKCASE GASES FROM ENGINES

This is a continuation application of U.S. patent application Ser. No. 12/203,815 filed on Sep. 3, 2008.

BACKGROUND OF INVENTION

1. Field of the Invention

The present invention relates generally to internal combustion engines, and specifically to separation of oil from crankcase gases of internal combustion engines.

2. Description of Related Art

In automobile racing, and especially in the sport of drag racing, horsepower is very important. Drag races are often decided by thousandths of a second. Even small gains in engine efficiency can lead to victory. One well known method of increasing engine efficiency in the art of engine building is to run a vacuum pump on the crankcase side of the engine. Crankcase gases are often evacuated to a "breather," which is typically a reservoir with a fiber-based filter element on top. Although these vacuum systems are successful in increasing horsepower, oil particles are typically exhausted from the "breather" at a high rate. This condition pollutes, creates a fire risk, and causes unsafe conditions on race tracks. Because of the way current systems are designed, an oil mist accumulates in the engine compartment (on the engine, underside of the hood and firewall). One of the most annoying responsibilities of a crew chief for drag racing is cleaning the engine compartment between races. If not cleaned between races, this accumulated oil can cause a fire hazard.

The most common vacuum systems for internal combustion engines are belt driven centrifugal pumps. These pumps are typically driven by the crankshaft. They draw crankcase gases from fittings on valve covers or from the oil valley. The gases are a mixture of the products of combustion that flow past the pistons ("blow-by gases") and air filled with atomized oil particles created by the rotating action of the crankshaft. Although these systems add weight to a vehicle, in drag racing the net increase in horsepower is thought to offset the undesirable effect of the additional weight. State-of-the-art vacuum systems are commercially available from Aerospace Components of St. Petersburg, Fla. and Moroso of Guilford, Conn., for example.

Water-cooled engines also need overflow volume for expansion of fluid in the cooling system as the engine heats. This is normally a separate accumulator system on a race car. It requires a second mounting area, extra weight, and reduces the amount of space in the engine compartment area. Current systems on racecars have several parts that work together in an attempt to separate air, oil and water. These include: an oil/air separator prior to the vacuum pump, an atmospheric air volume regulator (pressure regulator) prior to the vacuum pump, an oil accumulator tank, a breather filter on top of the oil accumulator, and a water accumulator for overflow.

The need for oil-air separators has been felt since the advent of the internal combustion engine. U.S. Pat. No. 973,118, dated Oct. 18, 1910, discloses an apparatus that draws gases out of the crankcase, and recycles those gases into the intake of the cylinders. This early form of the oil-air separator took the form of "a pipe . . . to maintain the air free of oil or dirt . . . ."

U.S. Pat. No. 5,063,882, titled "Oil Separation for Gases from a Crankcase of an Internal Combustion Engine," to Dr. Ing. h. c. F. Porsche Aktiengesellschaft discloses an oil separator based on a labyrinth comprising two deceleration paths for oil contained in crankcase gases.

U.S. Pat. No. 6,167,849 discloses an oil collector particularly adapted to motorcycles. It is said to cool blow-by gases containing oil vapor and particles and then to discharge the gases to the atmosphere through a filter, which is not described, but appears to be conventional pleated air filter.

U.S. Patent Application Publication No. 2008/0047505 A1, titled "Oil Separator Element," discloses an oil separator element that operates by setting crankcase gases in rotational motion so that centrifugal forces cause oil droplets to form on the walls of the grooves in the filter element.

What is needed, especially for race cars, is a system that combines the oil/air/water separation into one unit. Not only could this system eliminate the need for all the separate systems listed above, it would also reduce the weight of the car (each piece above plus all their brackets, clamps). With only one unit (compared to six separate pieces) required to accomplish the tasks, adjustments and replacements would also be much simpler. For race cars, and for crankcase gases from all internal combustion engines, including those in all vehicles and stationary engines, there is a need for a more effective, economical apparatus to separate the oil in crankcase gases from the gas phase and accumulate the separated oil.

BRIEF SUMMARY OF THE INVENTION

The problem of efficiently separating oil from crankcase gases is provided by a combination of centrifugal force, cooling of a surface and a filter made by a bed of particles. A canister for use in race cars is provided by concentric accumulators for water and oil, with the bed of particles collecting oil so that it drains into the oil accumulator. A line for returning separated oil to the engine may be provided, with flow in the line being by pressure control or level control in the oil accumulator.

BRIEF DESCRIPTION OF THE SEVERAL VIEWS OF THE DRAWING(S)

DETAILED DESCRIPTION OF THE INVENTION

Figure 1:
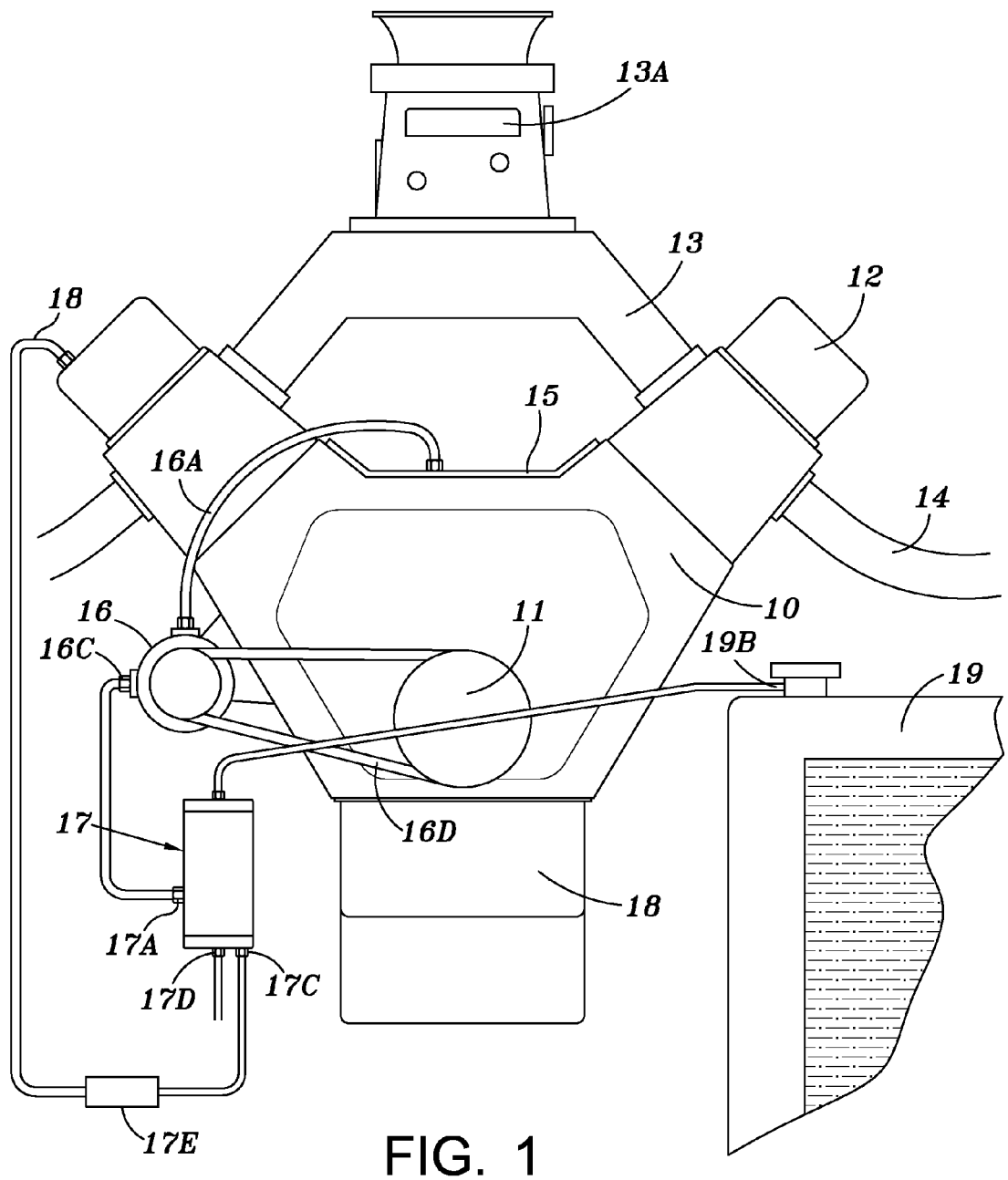
FIG. 1 is an elevation view of one embodiment of the device disclosed herein attached to the crankcase gas vacuum system and the cooling system of an engine.

Referring to FIG. 1, oil-air separator/accumulator 17 installed in the engine compartment of an automobile is illustrated. Also shown is vacuum pump 16, which is connected to oil valley cover 15 for removing crankcase gases from engine block 10 through hose 16A. Vacuum pump 16 may not be used, and separator/accumulator 17 may be connected directly to oil valley cover 15 or any other location on the engine for venting crankcase gases. Power for vacuum pump 16 is taken through belt 16D from crankshaft pulley 11. Intake manifold 13 feeds fuel and air from carburetor 13A. Alternatively, electronic fuel injection can deliver fuel and air to intake manifold 13. Exhaust header 14 evacuates products of combustion from the cylinders of engine block 10.

Separator/accumulator 17 may be connected to radiator 19 through hose 19B, in which case separator/accumulator 17 may serve also as overflow accumulator for radiator 19. Water drain valve 17D may be opened to remove accumulated water. A tube connected to radiator 19 may extend into the water accumulator.

Oil may be drained from separator/accumulator 17 through oil drain valve 17C, in which case valve 17C has a drain tube as shown attached to valve 17D, into a separate container. Alternatively, oil drain valve 17C may be always open and connected by hose to valve 17E. Oil may then flow through valve 17E and return to valve cover 12 through hose 18. Hose 18 may be attached to the engine in any low-pressure location to return oil to the lubrication system. Oil pan/crankcase 18 is the main lubricating oil reservoir for the engine.

The reasons to automatically return the separated oil back to the engine through hoses and valve 17E depend on the environment and use of the engine. In drag racing, after every race the oil is usually drained into a cup or bowl and then discarded. Racing oil is expensive, so automatically returning the oil to the engine will save time and money. For engines running long times or continuously, including engines in automobiles, motorcycles, piston-driven aircraft (where a "wet belly" is common), circuit racing engines (all types), and industrial machines and equipment, returning oil to the engine will reduce air pollution as compared with burning it via the intake system of the engine or otherwise disposing of the oil.

Valve 17E may be a check valve supplied by Smart Products of Morgan Hill, Calif. It may be designed to open at selected pressures, for example, in the range of 1-3 psi. Opening pressure may be selected by observing operation of the accumulator/separator on an engine. Alternatively, check valve 17E may be a valve controlled by the oil level in separator/accumulator 17. Valves controlled by a fluid level in a container are well known in industry. Electrical signals may be used to control the opening and closing of valve 17E.

Crankshaft pulley 11 may rotate up to about 10,000-11,000 RPM, depending on engine design. Vacuum provided by vacuum pump 16 varies, and may reach an absolute pressure of about 18 to 20 in Hg when the engine is operating at high RPM. Discharge pressure from pump 16 is preferably just slightly above atmospheric pressure, so that lower intake pressure will be possible. Discharge pressure will be determined by pressure loss across separator/accumulator 17. Crankcase gas after removal of oil is discharged from the top of separator/accumulator 17.

Separator/accumulator 17 is preferably mounted in the engine compartment in a location where outside air contacts the surface to afford as much cooling of the surface as possible to maximize condensation of any oil vapor in the separator.

Figure 2:
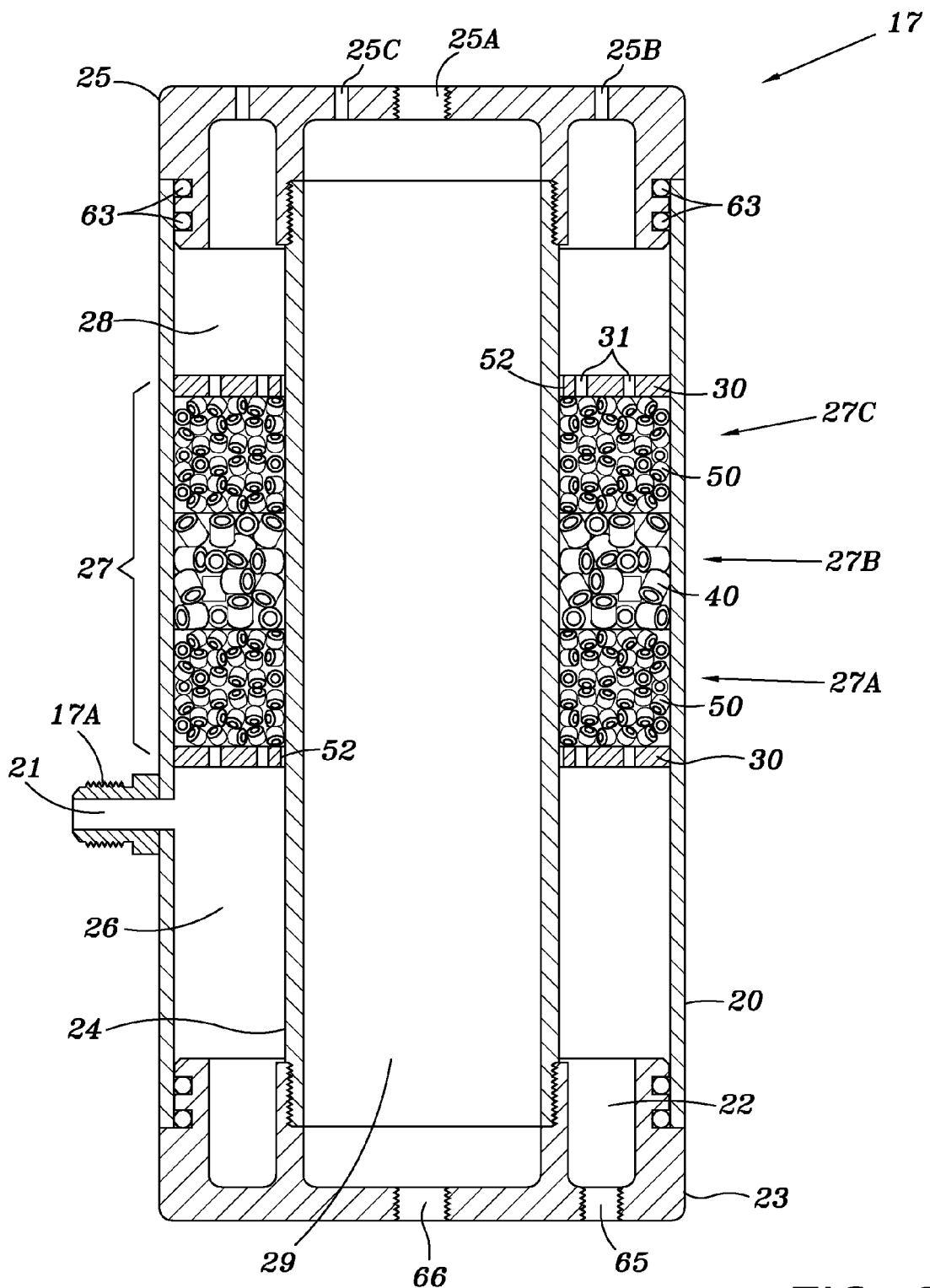
FIG. 2 is a cross-sectional view of one embodiment of the air-oil separator and liquid accumulator disclosed herein.

Referring to FIG. 2, a preferred embodiment of separator/accumulator 17 is illustrated. Crankcase gas inlet port 21 may be perpendicular to the surface of outer shell 20 or may be oriented at an angle to outer shell 20 to facilitate centrifugal force on particles in the incoming gas. Annular separation chamber 26 is formed by lower base 23, inner member 24 and outer shell 20. Oil accumulates in the lower portion of chamber 26 and is removed through oil outlet 65.

Figure 6:
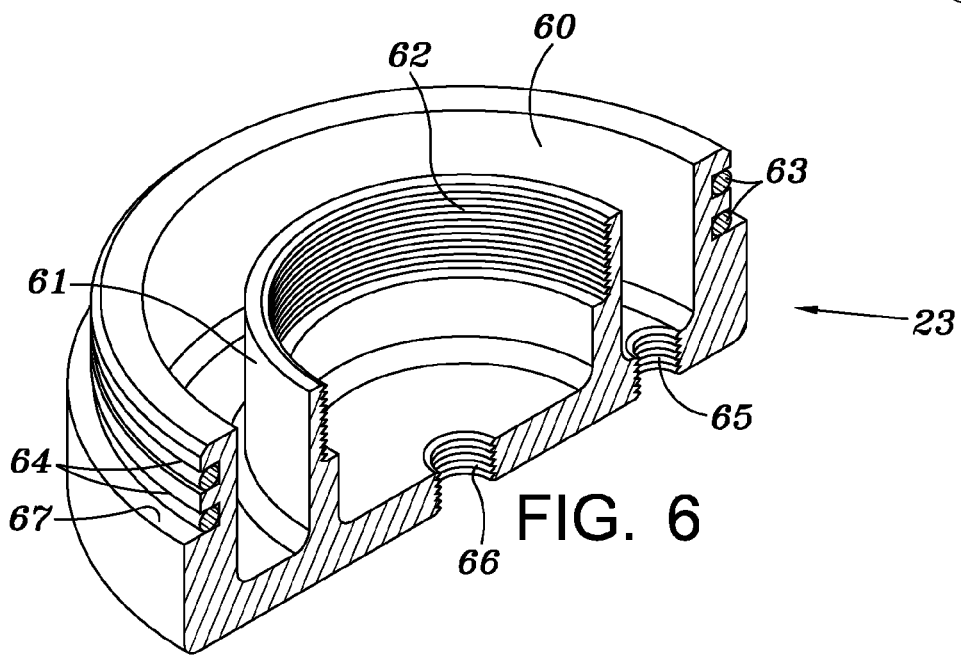
FIG. 6 is a cross-sectional perspective view of the lower base of one embodiment of the air-oil separator and liquid accumulator disclosed herein.

Base 23 is a cylindrical cup forming the bottom of separator/accumulator 17. A detailed cut away perspective view of base 23 is shown in FIG. 6. Outer shell retainer 60 is a cylindrical wall. The outer surface of outer shell retainer 60 has o-ring grooves 64, adapted for o-ring seals 63. Shoulder 67 acts as a seat for outer shell 20. Inside outer shell retainer 60 is inner shell retainer 61, with threads 62 on the inner surface of inner shell retainer 61, formed so as to accept the male threads of inner shell 24 (FIG. 2). The bottom of lower base 23 has oil outlet port 65 and water outlet port 66.

Top end piece 25 (FIG. 2) is also a cylindrical cup, and has the same outside and inside dimensions as base 23. Water inlet port 25A may be located at the center of top end piece 25. In the event of greater volume of water overflow than volume 29, port 25C may provide pressure relief. Air outlet ports 25B discharge cleaned gas from separator/accumulator 17. O-rings 63 seal top end piece 25 to outer shell 20. The outer casing of separator/accumulator 17 is formed by top end piece 25, outer shell 20 and base 23.

Oil-gas separation begins in chamber 26, where oil particles impinge on the surfaces. The gas stream then flows through filter section 27 and exhausts through volume 28 to the atmosphere. Filter section 27 may have lower filter particle layer 27A, middle filter particle layer 27B, upper filter particle layer 27C, and filter supports 30. Ports 31 in filter support 30 are sized to retain filter particles. Lower filter particle layer 27A may contain a selected amount of smaller filter particles 50. Middle filter particle layer 27B may contain a selected amount of larger cylindrical filter particle 40. Upper filter particle layer 27C may also contain smaller filter particles 50. Alternatively, the particles in each layer may be of the same size or any combination of sizes. A range of particle sizes may be placed in each layer. In a preferred embodiment, there is a gap between inner shell 24 and inner diameter 52 of filter supports 30 to allow oil to drain down inner shell 24.

Figure 3:
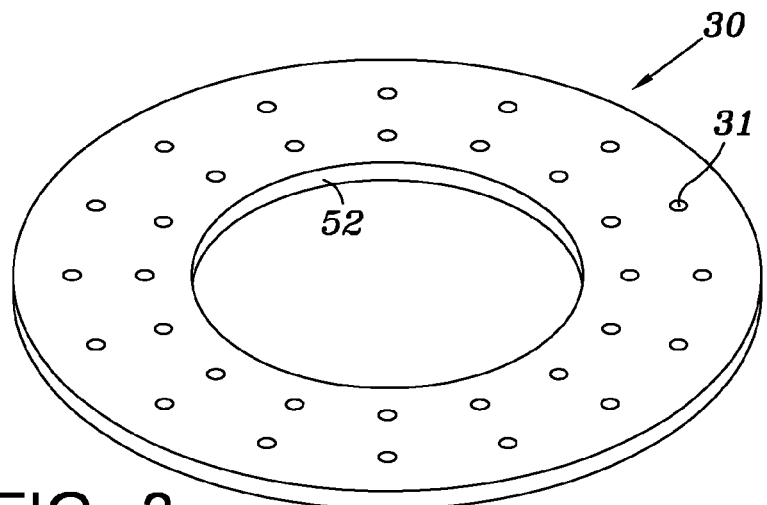
FIG. 3 is a perspective view of a filter support for particles in the air-oil separator.

Referring to FIG. 3, perforated filter support 30 is illustrated. In a preferred embodiment, two filter supports 30 are identical. Preferably, the outer diameter of filter support 30 is approximately equal to the inner diameter of outer shell 20 such that filter support 30 may be pressed into outer shell 20 and held in place inside outer shell 20 without a retainer. Filter support 30 has ports 31 through its surface. Inner diameter 32 is preferably formed to allow a gap between filter support 30 and inner shell 24.

Figure 4:
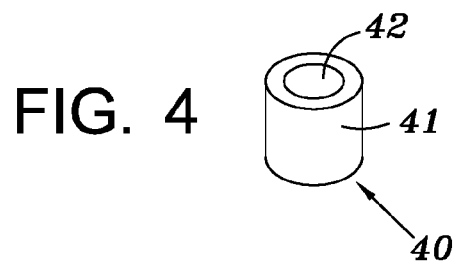
FIG. 4 is a perspective view of one embodiment of a particle for the filter.

Referring to FIG. 4, cylindrical filter particle 40 is illustrated, having cylindrical outer surface 41 and channel 42 through the particle. In a preferred embodiment, particle 40 is made of polymer having a high melting point and oil resistance, such as polyethylene, polypropylene, polystyrene, Teflon, or other polymers. Alternatively, filter particle 40 may be made of metal, or any other heat and oil resistant material. Particle 40 may be selected from particles from about 1/16 in diameter and length to about 3/8 in diameter and length. A preferred diameter and length is about 3/16 with a channel diameter of about 1/8 in. Particle 40 preferably has high surface area and sufficient size to cause low pressure drop across a bed of particles.

Figure 5:
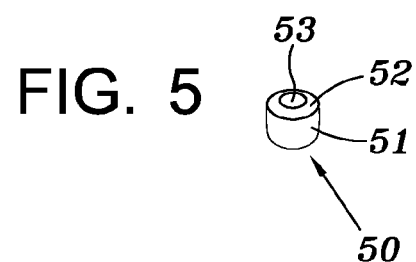
FIG. 5 is a perspective view of another embodiment of a particle for the filter.

Referring to FIG. 5, spheroid filter particle 50 is illustrated, having outer surface 51, conical end surface 52, and cylindrical channel 53 through the filter particle. In a preferred embodiment, spheroid filter particle 50 may have a composition and size as described for particle 40.

To assemble device 17, press fit lower filter support 30 into outer shell 20, as shown in FIG. 2. Screw inner member 24 into inner member retainer 61 of base 23. Seat seals 63 into grooves 64 of lower base 23 (FIG. 6). Press fit base 23 into outer shell 20. Add lower filter particle layer 27A, add middle filter particle layer 27B, then add upper filter particle layer 27C. Smaller particles may be used in one layer, as shown in FIG. 2. Any combination of particle sizes may be used, as described above. Press fit filter support 30 so as to contact upper filter particle layer 27C. Seat seals 63 into grooves 64 of top end piece 25. Screw upper end piece 25 onto threads of inner shell 24. The device may then be mounted and connected to an engine as shown in FIG. 1. The device may be used for air-oil separation only, in which case the connections to a radiator would not be made.

In volume 27, as gas containing oil droplets flows through the filter, oil impacts and wets the filter particles. Oil then drains downward through the filter particles. The individual filter particles preferably have a large surface area for wetting and for oil drainage. Channels through the particles, such as shown in FIGS. 4 and 5, are believed to allow greater rate of oil drainage. In all cases, the particles may have only one size or may be made up of intermixed particles. The particles may have one or more channels though the particles. The length of the bed of filter particles is preferably in the range from about ⅙ to about ⅚ of the distance from gas inlet port 21 to outlet ports 25B.

Apparatus 17 may be constructed in a wide range of sizes, depending on the engine on which it will be used and the conditions of use. The size of accumulator selected will vary depending on when and how accumulated liquid is to be removed. For example, for a race car for drag racing, outer shell 20 may have an outer diameter of 4 in, an inner diameter of 3⅞ in and a length of 11.5 in. Inlet port 21 may be ⅝ in diameter with center point 3¼ in from the bottom of outer shell 20. Inner shell 24 may have an outside diameter of 2 in. Ports 31, 25B and 25C may be about 0.09 inches in diameter.

The separator/accumulator of FIG. 2 was placed on a 750 HP racecar during drag races and used under actual race conditions. The engine compartment showed no evidence of oil coating surfaces after a race. Testing consistently resulted in an oil-free system that separated the oil/air/water without an oil/air separator accumulator tank and an air breather and internal baffle.

A test was also performed while a race shop was "dynoing" a customer's 1000+ HP engine. The race shop was using a standard system with internal baffles, which was releasing oil despite all attempts to correct it. The apparatus disclosed here was installed without any internal baffling. The water overflow was connected, the engineer made a pull on the dyno, and oil-free oil/air/water separation was observed.

Although the present invention has been described with respect to specific details, it is not intended that such details should be regarded as limitations on the scope of the invention, except to the extent that they are included in the accompanying claims.

We claim:

1. An apparatus for separation of oil from crankcase gases of an engine, comprising:
    a housing having a gas inlet and a gas outlet;
    a separation chamber in the housing;
    a first filter support having apertures therein located in the housing above the gas inlet;
    a second filter support having apertures therein located in the housing spaced from the first filter support;
    a filter element disposed between the first and second filter supports, and an oil outlet formed in the housing; and
    an inner member within the housing extending lengthwise of the housing, wherein the inner member is a tubular member and wherein the housing has a fluid inlet and a fluid outlet that are in fluid communication with the tubular member.

2. The apparatus of claim 1 wherein the filter element includes filtering particles.

3. The apparatus of claim 1, wherein the filter element comprises a plurality of layers, each of a selected size.

4. Apparatus as claimed in claim 1 wherein the separation chamber is an annular chamber formed between the housing and an inner member, and the gas inlet opens into the separation chamber.

5. Apparatus as claimed in claim 1 further including a chamber located above the second filter support, wherein a top wall of the housing has at least one gas outlet port communicating with the chamber.

6. Apparatus as claimed in claim 5 wherein the oil outlet is located in a bottom portion of the separation chamber.

7. The apparatus of claim 1 wherein the housing is in the form of a cylinder and the axis of the gas inlet port is offset at an angle to the perpendicular so that the gas is subject to a swirling motion as it enters the separation chamber.

* * * * *